M. REJKOWSKI.
VEGETABLE SLICING AND CHOPPING MACHINE.
APPLICATION FILED JUNE 7, 1921.

1,390,217.

Patented Sept. 6, 1921.
2 SHEETS—SHEET 1.

INVENTOR.
Martin Rejkowski
BY
ATTORNEY.

M. REJKOWSKI.
VEGETABLE SLICING AND CHOPPING MACHINE.
APPLICATION FILED JUNE 7, 1921.
1,390,217.
Patented Sept. 6, 1921.
2 SHEETS—SHEET 2.
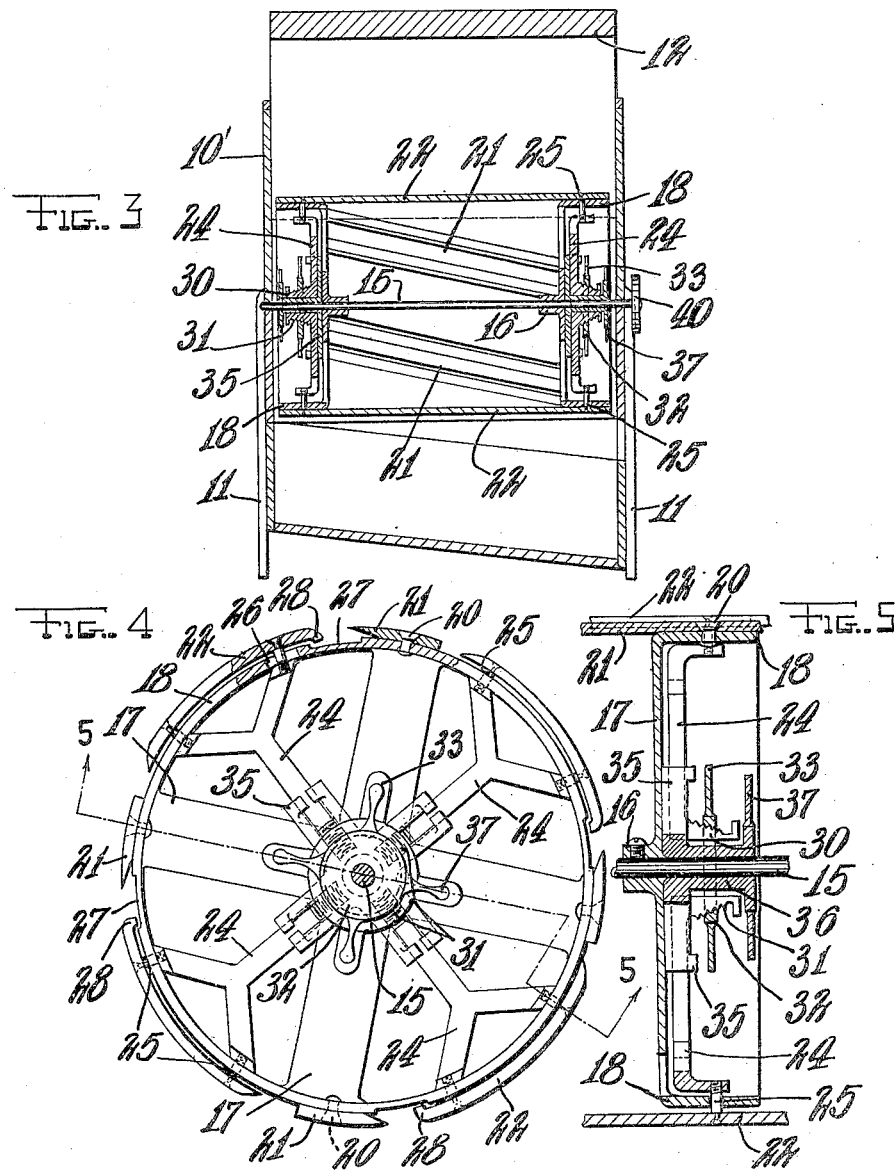
INVENTOR.
Martin Rejkowski

UNITED STATES PATENT OFFICE.

MARTIN REJKOWSKI, OF AKRON, OHIO.

VEGETABLE SLICING AND CHOPPING MACHINE.

1,390,217.   Specification of Letters Patent.   Patented Sept. 6, 1921.

Application filed June 7, 1921. Serial No. 475,577.

*To all whom it may concern:*

Be it known that I, MARTIN REJKOWSKI, citizen of Poland, residing at Akron, in the county of Summit and State of Ohio, have invented certain new and useful Improvements in Vegetable Slicing and Chopping Machines, of which the following is a specification.

This invention relates to vegetable chopping or slicing machines, having more particular reference to a machine in which a rotary drum is provided with one or more knives.

The invention has for an object to provide a machine of this type with a novel means for adjusting the cut of the machine to divide the vegetables into larger or smaller particles as may be desired.

For further comprehension of the invention, and of the objects and advantages thereof, reference will be had to the following description and accompanying drawings, and to the appended claims in which the various novel features of the invention are more particularly set forth.

Figure 1 of the drawings is a longitudinal vertical sectional view of a vegetable cutting machine constructed according to the invention.

Fig. 3 is a transverse section on the line 3—3 of Fig. 1.

Fig. 4 is a detail end elevation, with parts in section, of the drum.

Fig. 5 is a transverse section on the line 5—5 of Fig. 4.

Figure 1:
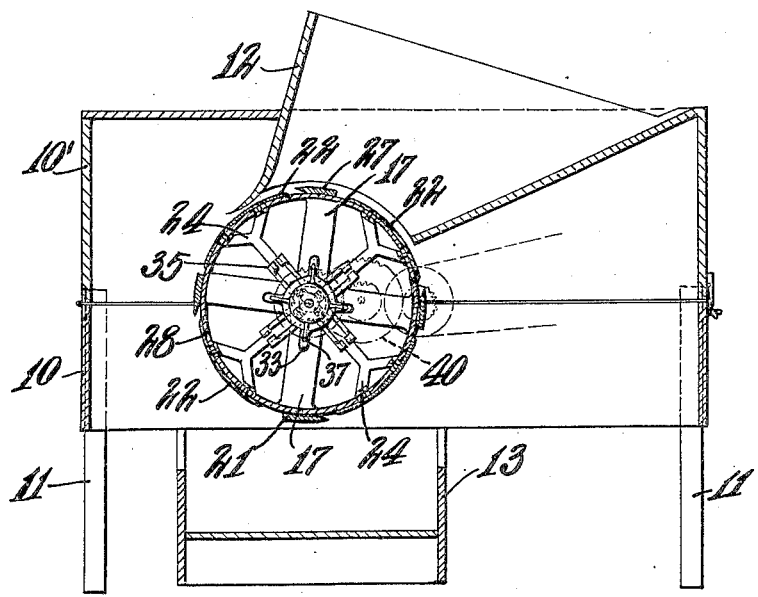
Figure 2:
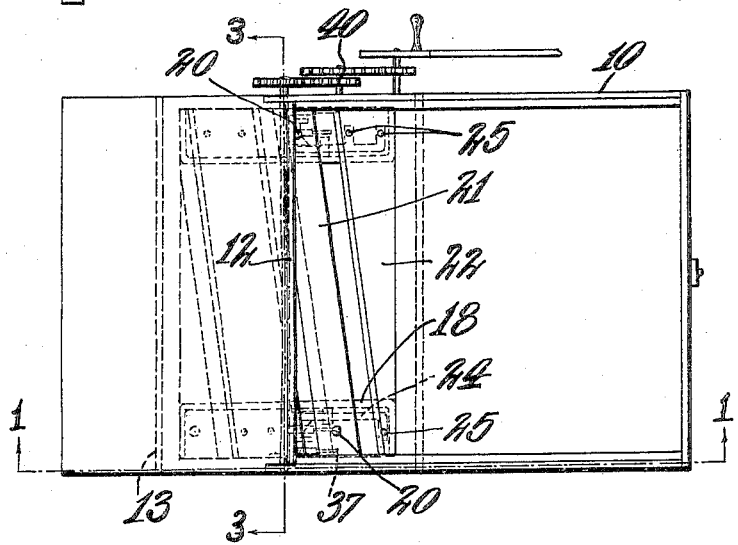
Fig. 2 is a plan view thereof.

In constructing my improved vegetable cutting machine I provide a box-like casing comprising a lower portion 10 mounted on legs 11 and an upper portion 10' hinged thereto and having a hopper 12 formed in the top thereof, the bottom of the casing being open, a receptacle 13 being located under the casing to receive the cut vegetables.

Extending transversely of the casing and suitably supported in the side walls thereof, is a horizontal shaft 15, upon which are fixed a pair of drum heads comprising hub elements 16 having radiating spokes 17 which carry rings or bands 18 on their outer ends.

To these rings or bands 18 are fixed, as by rivets 20, the opposite ends of cutting blades or knives 21 which extend from end to end of the drum and are helically inclined as shown. The material being cut passes into the drum between these knives and a series of adjustable gage elements in the form of arcuate plates 22 extending from end to end of the drum and having a helical inclination corresponding to that of the knives 21.

These plates 22 are adapted for adjustment circumferentially of the drum to vary the width of the slots therebetween and the cutting edges of the blades, and to this end they are mounted on the forked ends of radial arms 24 which may all be tensioned or loosened in unison to tighten the plates 22 on the rings 18, or loosen them. The plates 22 are here shown as fixed to the outer ends of radial studs or bolts 25 whose inner ends are fixed to the forked extremities of the arms 24, these studs or bolts passing through arcuate slots 26 in the rings 18. The rings 18 have recesses 27 formed therein adjacent the cutting edges of the knives 21 while the plates 22 have rounded lips 28 along one edge which facilitate passage of the material to the knives and project into these recesses at their ends.

To tension the arms 24 the latter are formed on their inner ends with tapering hub elements 30 which jointly form sections of a common cone and are provided with exterior screw threads 31. Upon these hub elements 30 a nut 32 is screwed, being provided with turning handles 33.

To adjust the arms 24 circumferentially they are guided in radial guide elements 35 formed on a sleeve 36 which is interposed freely between the hub members 30 and the shaft 15 and is provided with turning handles 37.

In the operation of my improved vegetable cutter the vegetables in hopper 12 are moved toward the left hand wall by the rotation of the drum and severed by the knives 21, passing through the slots between the knives and plates 22.

When it is desired to adjust the plates 22 the nuts 32 are loosened, the sleeves 36 given a partial turn, and the nuts again tightened, the tightening of the nuts tensioning the arms 24 and clamping the plates 22 on the drum head rings 18, it being apparent that rotary movement of nuts 32 acts to draw the arms inwardly by reason of the collective conical shape of the elements 30.

The shaft 15 may be driven by any suitable means such as a belt or a crank handle operating through the reducing gearing 40.

Having thus described my invention what I claim as new and desire to protect by Letters Patent of the United States is as follows:—

1. In a vegetable cutter, a drum, a series of knives carried thereby, plates mounted upon said drum adjacent said knives, and means for adjusting said plates circumferentially on said drum.

2. In a vegetable cutter, a drum, a series of knives carried thereby, a series of radial arms in said drum, plates fixed to the outer ends of said radial arms, and means for adjusting said arms circumferentially.

3. In a vegetable cutter, a drum, a series of knives carried thereby, a series of radial arms in said drum, plates fixed to the outer ends of said radial arms, and means for adjusting said arms circumferentially, said means including a sleeve loosely mounted on the drum shaft and having radial guide elements in which said arms are engaged.

4. In a vegetable cutter, a drum, a series of knives carried thereby, a series of radial arms in said drum, plates fixed to the outer ends of said radial arms, and means for adjusting said arms circumferentially, and means for tensioning said arms radially to clamp the said plates upon the drum.

5. In a vegetable cutter, a drum, a series of knives carried thereby, a series of radial arms in said drum, plates fixed to the outer ends of said radial arms, and means for adjusting said arms circumferentially, and means for tensioning said arms radially to clamp the said plates upon the drum, said means including tapered hub elements on said arms jointly forming an exteriorly threaded conical hub, and a nut screwed on said hub.

6. In a vegetable cutter, a drum comprising a pair of heads having cylindrical flanges, a shaft on which said heads are fixed, knives fixed at opposite ends to said heads, arcuate plates extending parallel to said knives, radial upon the outer ends of which said plates are fixed, sleeves loosely inclosing the shaft and having radial guide elements for said arms, hub elements on the inner ends of said arms jointly forming an exteriorly threaded conical hub surrounding and spaced from said sleeves, and nuts threaded on said hub elements.

In testimony whereof I have affixed my signature.

MARTIN REJKOWSKI.